(12) United States Patent
Denning et al.

(10) Patent No.: US 9,972,053 B2
(45) Date of Patent: *May 15, 2018

(54) SYSTEM AND METHOD FOR CREATING INSURANCE VIRTUAL AFFINITY GROUPS

(71) Applicant: Hartford Fire Insurance Company, Hartford, CT (US)

(72) Inventors: Ryan Owen Denning, West Hartford, CT (US); Mushter Munib Moin, Newington, CT (US); Deborah L. Perschy, Southington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 102 days.

This patent is subject to a terminal disclaimer.

(21) Appl. No.: 14/143,512

(22) Filed: Dec. 30, 2013

(65) Prior Publication Data
US 2014/0114697 A1  Apr. 24, 2014

Related U.S. Application Data

(63) Continuation of application No. 13/712,435, filed on Dec. 12, 2012, now Pat. No. 8,639,603.
(Continued)

(51) Int. Cl.
*G06Q 40/08* (2012.01)
*G06Q 50/00* (2012.01)

(52) U.S. Cl.
CPC .............. *G06Q 40/08* (2013.01); *G06Q 50/01* (2013.01)

(58) Field of Classification Search
CPC ......... G06Q 40/08; G06Q 50/00; G06Q 50/01
(Continued)

(56) References Cited

U.S. PATENT DOCUMENTS 5,890,129 A    3/1999  Spurgeon
6,571,216 B1 *  5/2003  Garg ...................... G06Q 30/02
                                                  705/14.25
(Continued)

OTHER PUBLICATIONS

Pavel's Insurance Blog, "Affinity Discount—Your Occupation can Save Money on Insurance", Aug. 20, 2010, <http://blog.farmersinsuranceca.com/2010/08/20/use-your-occupation-to-save-money-on-insurance/>.*
(Continued)

*Primary Examiner* — Eric T Wong
*Assistant Examiner* — Joshua D. Bradley
(74) *Attorney, Agent, or Firm* — Howard IP Law Group, PC

(57) ABSTRACT

Pursuant to some embodiments, systems, methods, apparatus and computer program code for creating and administering virtual affinity groups are provided. Pursuant to some embodiments, a computer implemented processing method is provided which includes receiving, at an insurance processing platform, information identifying at least a first characteristic of a virtual affinity group, receiving, at the insurance processing platform, information identifying at least a first feature of the virtual affinity group and at least a first insurance related benefit to be offered to the virtual affinity group, automatically identifying at least a first individual matching the at least first characteristic, and communicating to the at least first individual information allowing the at least first individual to participate in the virtual affinity group.

16 Claims, 5 Drawing Sheets

Related U.S. Application Data

(60) Provisional application No. 61/659,749, filed on Jun. 14, 2012.

(58) Field of Classification Search
USPC .................................................... 705/4
See application file for complete search history.

(56) References Cited

U.S. PATENT DOCUMENTS

| | | | |
|---|---|---|---|
| 7,050,818 B2 | 5/2006 | Tendler | |
| 7,596,515 B2 | 9/2009 | Eckel, Jr. | |
| 7,925,523 B1 | 4/2011 | McConnell et al. | |
| 8,060,117 B1 | 11/2011 | Tendler | |
| 8,095,425 B2* | 1/2012 | Morrow | G06Q 30/02 705/26.1 |
| 8,108,501 B2 | 1/2012 | Birnie et al. | |
| 8,145,275 B2 | 3/2012 | Cunningham et al. | |
| 8,199,697 B2 | 6/2012 | McNamara et al. | |
| 8,296,356 B2 | 10/2012 | Obasanjo et al. | |
| 8,306,874 B2 | 11/2012 | Morgenstern et al. | |
| 8,340,983 B2 | 12/2012 | Grover et al. | |
| 8,543,430 B1* | 9/2013 | Fields | G06Q 40/08 705/2 |
| 8,639,535 B1* | 1/2014 | Kazenas | G06Q 40/00 705/2 |
| 8,639,603 B2* | 1/2014 | Denning | G06Q 50/01 705/35 |
| 8,639,629 B1* | 1/2014 | Hoffman | G06Q 20/20 705/44 |
| 8,645,014 B1 | 2/2014 | Kozlowski et al. | |
| 8,660,864 B2* | 2/2014 | Krause | G06Q 40/08 705/4 |
| 8,666,376 B2* | 3/2014 | Ramer | G06Q 30/02 455/414.3 |
| 8,799,028 B1* | 8/2014 | Warden | G06Q 50/01 705/3 |
| 8,935,346 B2* | 1/2015 | Jackson | G06Q 50/01 709/203 |
| 8,938,512 B2* | 1/2015 | Jackson | G06Q 30/0269 709/203 |
| 9,177,347 B2* | 11/2015 | Jackson | G06Q 50/01 |
| 9,672,492 B2* | 6/2017 | Peak | G06Q 10/10 |
| 2001/0037265 A1 | 11/2001 | Kleinberg | |
| 2002/0188484 A1 | 12/2002 | Grover et al. | |
| 2002/0194033 A1* | 12/2002 | Huff | 705/4 |
| 2007/0226014 A1 | 9/2007 | Alemayehu et al. | |
| 2008/0104227 A1 | 5/2008 | Birnie et al. | |
| 2008/0228531 A1 | 9/2008 | Kenedy et al. | |
| 2008/0281726 A1 | 11/2008 | Gupta | |
| 2008/0288298 A1 | 11/2008 | Dattatreya et al. | |
| 2009/0037211 A1 | 2/2009 | McGill et al. | |
| 2009/0112701 A1* | 4/2009 | Turpin et al. | 705/10 |
| 2009/0192865 A1* | 7/2009 | Soza | G06Q 10/107 705/7.33 |
| 2010/0100398 A1* | 4/2010 | Auker | G06Q 10/087 705/4 |
| 2010/0205014 A1 | 8/2010 | Sholer et al. | |
| 2010/0324941 A1 | 12/2010 | Stevenson et al. | |
| 2011/0112957 A1 | 5/2011 | Ingram et al. | |
| 2011/0131076 A1* | 6/2011 | Leidner | G06Q 10/0635 705/7.28 |
| 2011/0137975 A1 | 6/2011 | Das et al. | |
| 2011/0145023 A1* | 6/2011 | Stahl et al. | 705/4 |
| 2011/0153368 A1 | 6/2011 | Pierre et al. | |
| 2011/0159890 A1 | 6/2011 | Fortescue et al. | |
| 2011/0161119 A1 | 6/2011 | Collins | |
| 2011/0320341 A1 | 12/2011 | Kremen | |
| 2011/0320342 A1 | 12/2011 | Kremen | |
| 2012/0095861 A1 | 4/2012 | Feng et al. | |
| 2012/0116550 A1* | 5/2012 | Hoffman et al. | 700/91 |
| 2012/0157113 A1 | 6/2012 | Brisebois et al. | |
| 2012/0221357 A1 | 8/2012 | Krause et al. | |
| 2012/0245963 A1* | 9/2012 | Peak | G06Q 50/01 705/4 |
| 2012/0290329 A1 | 11/2012 | Ross | |
| 2012/0296731 A1 | 11/2012 | Ross | |
| 2013/0124294 A1* | 5/2013 | Peak | G06Q 30/02 705/14.33 |
| 2013/0185189 A1* | 7/2013 | Stewart | G06Q 40/02 705/38 |
| 2013/0222133 A1 | 8/2013 | Schultz et al. | |
| 2013/0325517 A1* | 12/2013 | Berg | G06Q 10/10 705/4 |
| 2013/0339062 A1* | 12/2013 | Brewer | G06Q 40/08 705/4 |
| 2013/0339064 A1* | 12/2013 | Denning | G06Q 40/08 705/4 |
| 2013/0339065 A1* | 12/2013 | Denning | G06Q 40/08 705/4 |

OTHER PUBLICATIONS

BusinessWire, "Farmers Insurance Now Offers a Discount to Engineers, Firefighters, Police Officers, Physicians and Surgeons, Registered Nurses, Scientists and Teachers in Missouri", Aug. 11, 2003, <http://www.businesswire.com/news/home/20030811005760/en/Farmers-Insurance-Offers-Discount-Engineers-Firefighters-Police>.*

IEEE, "IEE Sponsored Discounts", Accessed via the Wayback Machine Apr. 3, 2011, <https://web.archive.org/web/20110403112817/http://www.ieee.org/membership_services/membership/discounts/faq.html>.*

Weiss, Marie-Andree, "Social Media Sites and Underwriting", Accessed via the Wayback Machine Dec. 15, 2011, <http://apps.americanbar.org/buslaw/committees/CL320000pub/newsletter/201101/weiss.pdf>.*

Ramasastry, Anita, "Will Insurers Begin to Use Social Media Postings to Calculate Premiums? A Look at Some Startling Trends and the Possible Consequences for Consumers", Jan. 3, 2012, Verdict.justia.com, <https://verdict.justia.com/2012/01/03/will-insurers-begin-to-use-social-media-postings-to-calculate-premiums>.*

PWC, "Insurance 2020: Turning change into opportunity", Jan. 2012.*

Scism, Leslie and Mark Maremont, "Insurers Test Data Profiles to Identify Risky Clients", Nov. 19, 2010, The Wall Street Journal, <http://www.wsj.com/articles/SB10001424052748704648604575620750998072986>.*

Nance-Nash, Sheryl, "What Insurers Could Do With Your 'Social Media Score'", Dec. 12, 2011, aol.com, <http://www.aol.com/article/2011/12/12/what-insurers-could-do-with-your-social-media-score/20124850/>.*

Ha, Young, "In Few Years, Social Network Data May Be Used in Underwriting", Oct. 13, 2011, Insurance Journal, <http://www.insurancejournal.com/news/national/2011/10/13/219764.htm>.*

Schaerer, Markus, "Transforming the Insurance Industry to Increase Customer Relevance", Mar. 2011, CISCO White Paper.*

Voelker, Michael, "Social Media: Reach Out and Touch Someone", May 1, 2012, PropertyCasualty360, <http://www.propertycasualty360.com/2012/05/01/socialmediareachoutandtouchsomeone?page_all=1&slreturn=1473745770>.*

Ernst & Young,"Time for Insurers to Rethink their Relationships", Feb. 20, 2012, <http://www.ey.com/Publication/vwLUAssets/Global_Consumer_Insurance_Survey_2012_-_The_Americas/$FILE/EY_GIR_AMERICAS_SML.pdf>.*

IBM, "Insurance in the Age of Analytics", Apr. 2012.*

Larocco, Michael, "Ultra-Niche Advertising, Cherry Picking Now Possible With Facebook, Google Ads", Nov. 22, 2010, PropertyCasualty360.com, <http://www.propertycasualty360.com/2010/11/22/ultraniche-advertising-cherry-picking-now-possible-with-facebook-google-ads?page_all=1&slreturn=1473787781>.*

Esurance, "Esurance Launches Car Insurance Discount for Facebook Users in Texas", Jul. 10, 2012, Esurance Press Release, <https://www.esurance.com/company/news/2012-texas-facebook-users-can-save-10-percent-with-a-like> (Year: 2012).*

(56) References Cited

OTHER PUBLICATIONS

Anonymous, "News-Social Networking" Oct. 23, 2008, Post Magazine, p. 3.
Sciam et al., "Insurers Test Data Profiles to Identify Risky Clients", Nov. 19, 2010, Wall Street Journal., 4 pages.

* cited by examiner

SYSTEM AND METHOD FOR CREATING INSURANCE VIRTUAL AFFINITY GROUPS

CROSS REFERENCE TO RELATED APPLICATIONS

This application is a continuation application of co-pending U.S. patent application Ser. No. 13/712,435 entitled SYSTEM AND METHOD FOR CREATING AND ADMINISTERING INSURANCE VIRTUAL AFFINITY GROUPS, filed Dec. 12, 2012, which in turn claims the benefit of and priority to, under 35 U.S.C. 119(e), U.S. Provisional Patent Application Ser. No. 61/659,749 filed on Jun. 14, 2012, the contents of all of which are hereby incorporated herein by reference in their entireties for all purposes.

BACKGROUND

Advances in computing and data processing have led to the creation of large sets of data about consumers and their interests. The data includes information from a wide variety of sources, including postal data, census and demographic data, and increasingly, data accumulated via user interaction with social media and other Websites such as the FACEBOOK® social media service, the TWITTER® social media service, Internet forums, question and answer sites (such as the STACKEXCHANGE® question and answer service), and the like.

Frequently, this interaction data can be matched to a specific individual or business. Advertisers currently use some data to target advertising to individuals based on their interests. For example, the GOOGLE® internet search service provides tools for advertisers to place keyword and demographically-targeted ads on Web pages which are considered to be relevant to consumers based on their search terms and based on their location and other demographic information.

Many consumers affirmatively take steps to join and participate in groups that provide information or benefits based on shared characteristics of a group. For example, many consumers who are retired or near retirement age join (and pay a monthly or annual fee to) the AARP retiree organization. Membership in such a traditional group provides a number of benefits to consumers who join, including discounts on certain products as well as information of interest to consumers who share the characteristic of being at or near retirement age. Unfortunately, however, participation requires that a consumer proactively seek out and obtain a membership in the group.

Individuals and businesses often search for, comment on, and interact with topics of interest that either involves insurable assets (such as automobiles, motorcycles, homes, electronics, or the like) or that could provide information to insurance underwriters regarding the insurability of the individual or business. It would be desirable to use information from such searches, comments and interactions to provide insurance related offers and information to such individuals or businesses.

DETAILED DESCRIPTION

Figure 1:
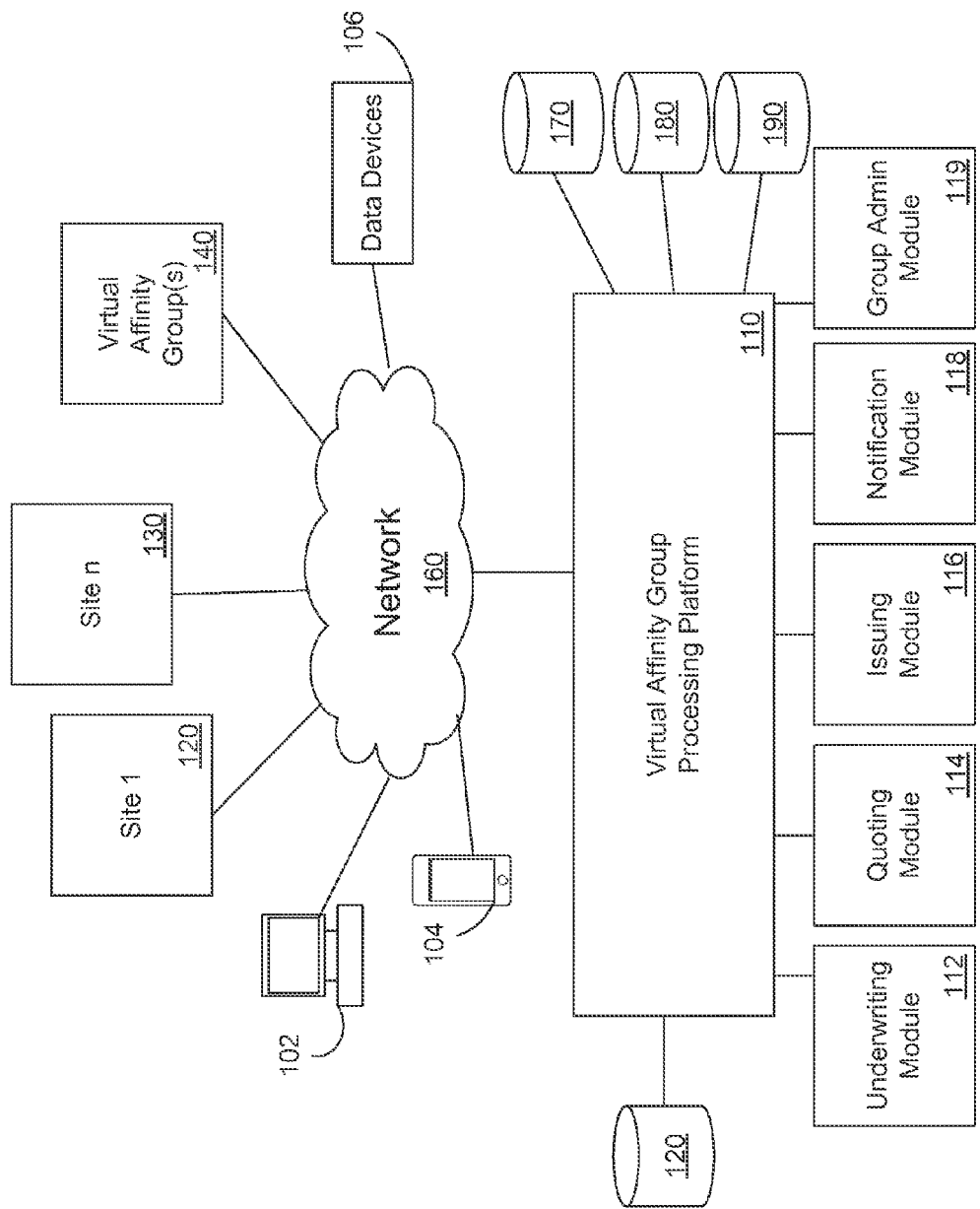
FIG. 1 is block diagram of a system according to some embodiments of the present invention.

Pursuant to some embodiments, systems, methods, apparatus and computer program code for creating and administering virtual affinity groups are provided. Pursuant to some embodiments, a computer implemented processing method is provided which includes receiving, at an insurance processing platform, information identifying at least a first characteristic of a virtual affinity group, receiving, at the insurance processing platform, information identifying at least a first feature of the virtual affinity group and at least a first insurance related benefit to be offered to the virtual affinity group, automatically identifying at least a first individual matching the at least first characteristic, and communicating to the at least first individual information allowing the at least first individual to participate in the virtual affinity group. In some embodiments, the at least first characteristic of the virtual affinity group is selected from a known aggregated group of insurance characteristics. For example, the at least first characteristic may be a demographic or psychographic attribute of consumers or businesses that are known or predicted to possess a desired insurance risk profile. The aggregated group of insurance characteristics may be obtained from insurance underwriting data, existing or predicted loss and claim data, or the like. In some embodiments, the at least first characteristic is selected as a seed or starting point for the creation of a virtual affinity group and additional characteristics may be identified to further refine the participants in the virtual affinity group.

As used herein, the term "virtual affinity group" refers to a group of one or more individuals or entities that have been identified as matching one or more eligibility criteria or characteristics (e.g., such that the individuals or entities possess a common "affinity" or interest). The group is referred to as being "virtual" in that the relationship between the individuals or entities need not be physical or defined other than based on their common affinity or interest.

Prior to discussing features of some embodiments, an illustrative (but not limiting) example will be provided. This example will be referenced throughout the remainder of this specification to assist in describing features of some embodiments. In the illustrative example, an operator or administrator of a system pursuant to the present invention has identified (either automatically by operation of the system or otherwise) that car enthusiasts with certain criteria are desirable insurance prospects. More particularly, for the purposes of the illustrative example, it has been determined that there are a number of enthusiasts who are interested in (or have) AUDI A4 automobiles. These enthusiasts express their interest by searching the Internet using keywords such as "AUDI A4", "AUDI A4 forum", "AUDI A4 mods", etc. Further, these enthusiasts visit Internet sites such as the AUDIWORLD internet site, the AUDIFORUMS internet site and the like, and many of the enthusiasts post comments on those sites. Further, many of the enthusiasts express their interest in AUDI A4 automobiles by "liking" "AUDI A4" on the FACEBOOK® social media service or other social networking sites or by including "AUDI A4" (or variants thereof) in their profile on various sites.

In the illustrative example, an operator or administrator of a system of the present invention establishes characteristics for an AUDI A4 virtual affinity group. The characteristics may include criteria for inclusion in the affinity group. The criteria may include demographic criteria (for example, the individual must be located in the United States, or even a region within the United States), socio-economic criteria (e.g., the individual must be located in an area that has, or otherwise be known to have, an annual household income greater than $100,000), and an interest level (e.g., as measured by the quantity, quality and/or nature of their comments, posts, and searches for topics relating to AUDI A4 automobiles). In the illustrative example, at least a first of the characteristics is identified based on existing insurance data that is known or predicted to provide a desired insurance risk profile (e.g., it may be known that the aggregated group that consists of individuals residing in certain geographical areas and who have an annual household income greater than $100,000 present a desired insurance risk profile for certain types of personal lines insurance policies).

Once one or more characteristics have been established, the operator or administrator may establish content and features of the virtual affinity group. In some embodiments, this may include establishing a separate web property associated with the group (which may be an automatically generated subdomain or top level domain) as well as establishing content and content sources for the virtual affinity group. The content and content sources may include informative articles or other items of content of specific interest to a group of AUDI A4 aficionados. Further, the web property may include interactive features (such as a forum, the ability to ask questions, provide answers, upload pictures, or the like). The web property may also include an aggregation of content and other information from other sources (e.g., via RSS or other feeds of data). The operator or administrator may also define one or more insurance-related offers or benefits to provide to members of the virtual affinity group. For example, an automobile policy (or set of policies) may be created or tailored to AUDI A4 owners (or prospective owners).

Once the web property and insurance-related offers or benefits have been defined, the operator or administrator may trigger or launch a process which identifies eligible individuals. This process may run continuously or periodically to identify new individuals. Eligible individuals may be those individuals who meet the criteria established by the operator or administrator (e.g., pursuant to the example, anyone living in the U.S. who has an annual household income greater than $100,000 and who expresses a high level of interest in AUDI A4 automobiles may be an eligible individual). Once identified, those individuals may be invited or encouraged to join the AUDI A4 virtual affinity group through advertisements for the virtual affinity group, targeted emails, postal mail, or the like. An individual who wishes to participate may then visit the web property associated with the virtual affinity group and enjoy the content and features of the web property, as well as the insurance-related benefits created for the group. In some embodiments, no web property need be created—instead, the group may simply consist of qualified members who are eligible to receive insurance related benefits and offers. As will be described further below, such virtual affinity groups may also be private or anonymous such that an eligible individual need not take any action to enjoy the insurance-related benefits.

As another illustrative, but not limiting, example, an insurance company may identify that physically active males between the age of 35 and 45 present a desirable insurance profile (based on an analysis of existing claim and loss data). A virtual affinity group may be established based on that information and physically active males in that age range may be identified by analyzing data from a wide variety of sources, including data from users of exercise sensors (such a that provided by the FITBIT® activity monitoring service or the like), data from social networks and the like. Such further analysis may result in the addition of further data sources to identify individuals for participation in the virtual affinity group and/or the addition of further characteristics to further refine the definition of the group.

For example, it may be determined that participants of a virtual affinity group consisting of active males between the age of 35 and 45 may be identified by analyzing specific additional types of social data. For example, it may be determined that many of these physically active males frequently post information about their workouts or activities on sites such as the CROSSFIT activity monitoring service, the RUNKEEPER activity monitoring service or the like or share exercise and fitness data using a fitness API such as that provided by the FITBIT® activity monitoring service. As a result, the data collection systems for this virtual affinity group may be expanded to include monitoring and analysis of these sites and data sources. Further analysis of the virtual affinity group may also result in the identification of additional desired characteristics of the group. For example, it may be determined that physically active males between the age of 35 and 45 who walk at least 10,000 steps each day or who take part in CROSSFIT activity monitoring service workouts an average of 3 times a week are highly desirable insurance prospects. The characteristics of the virtual affinity group may be modified to include these additional characteristics (or new virtual affinity groups may be created which include these additional characteristics) and data collection and identification tools may be modified to identify individuals possessing these characteristics.

Further details, and features and advantages of virtual affinity groups will become apparent upon reading the following detailed description. Features of some embodiments will now be described by first referring to FIG. 1 which is a block diagram of a processing platform 100 according to some embodiments of the present invention. The platform 100 may, for example, facilitate the creation and administration of virtual affinity groups using demographic, search, community, social and business network based data such as information published by individuals or businesses (e.g., via the TWITTER social media service, the FACEBOOK social media service, the GOOGLE+ social media service, or the like), as well as information shared by individuals or businesses via searches, comments, postings, or the like. For illustrative, but not limiting, purposes such information may be published by sites or networks including the EBAY auction service, the FACEBOOK social media service, the LINKEDIN social media service, the TWITTER social media service, the BLOGGER blogging service, the MYSPACE social media service, the FRIENDSTER social media service, the GOOGLE+ social media service, the YOUTUBE video service, the PINTEREST social media service, and other similar sites. Information may also be obtained from applications (such as those provided through the Apple® store, the Android® marketplace or the like) and devices (such as mobile phones, navigation systems, desktop computers or the like). Information may also be obtained from monitoring or telematics devices. For example, fitness and health data may be obtained from wireless-enabled scales (which measure and provide data regarding weight and body mass), wearable devices that measure data such as the number of calories expended, the number of steps walked, the quality of sleep, or the like. Such data may be obtained from one or more data repositories such as those provided by the FITBIT® activity monitoring service or the like. For clarity and ease of exposition, individuals and businesses using features of the present invention to receive insurance services and information may generally be referred to herein as "consumers" or "individuals".

According to some embodiments, a virtual affinity group processing platform 110 may be provided for establishing, identifying, notifying, and otherwise administering virtual affinity groups based on data from a variety of sources, including social network sites, operator entry, Websites, or the like. By way of example only, the virtual affinity group processing platform 110 may be associated with and/or communicate with (or receive information about) customers, prospects, or other individuals and entities operating a variety of devices, including, for example, personal computers 102 (including desktop, laptop, tablet, or other types of computers), mobile devices 104 (such as mobile telephones), and other data devices 106 (such as sensors, networked devices, or the like).

In embodiments described herein, the virtual affinity group processing platform 110 may be operated to both establish and maintain virtual affinity groups, but also to perform a number of insurance-related activities, including the pricing, underwriting, issuance, administration and support of a number of different types of insurance policies, including personal lines, workers compensation, health, group benefits, and other commercial policies. Pursuant to some embodiments, virtual affinity group processing platform 110 receives data from a wide variety of sources including one or more social media or other websites or properties 120-130 and devices 102, 104, 106. The data received is used to enhance interactions with consumers and insured individuals and businesses. Further, virtual affinity group processing platform 110 may transmit data and notifications to consumers and insured individuals and businesses directly to devices 102, 104 or 106 or through one or more social media sites 120-130.

Further, pursuant to some embodiments, virtual affinity group processing platform 110 may cause the creation, maintenance, and updating of one or more virtual affinity groups 140 which are created as described herein. Those virtual affinity groups 140 may be created using platforms such as one or more existing social media sites 120-130 (e.g., a virtual affinity group such as the "AUDI A4" group described above, may include information hosted on a FACEBOOK® social media service page) or other web platforms (e.g., the "AUDI A4" group may include a WORDPRESS® blogging service powered website hosted on a subdomain or primary domain), or the like. For example, in one illustrative embodiment, an insurance company may use the infrastructure of an existing social network (such as those provided by the FACEBOOK® social media service or the GOOGLE+® social media service) to create virtual affinity groups for eligible individuals.

While a virtual affinity group pursuant to the present invention may include the use of a content platform allowing participants to interact with the group, such content is not required. For example, in some embodiments, virtual affinity groups may be created which do not include curated or other generated content. Instead, the virtual affinity group consists of individuals who share one or more characteristics of the group and those individuals are flagged or identified by the insurance processing platform 100 as being members of the group. Participation or inclusion in the group may provide the members with one or more insurance-related benefits (such as eligibility for reduced insurance rates, pre-qualification for one or more insurance products, or the like).

As used herein, devices including those associated with the virtual affinity group processing platform 110, and any other device described herein may exchange information via any communication network 160 which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Sites 120-130 may store, publish or otherwise provide access to information about consumers. For example, a consumer with a FACEBOOK social media service account may post status updates, information and comments to the FACEBOOK social media service, and the FACEBOOK social media service may publish or otherwise make the status updates, information or comments available to authorized individuals or entities. In some embodiments, one or more of the sites 120-130 may publish or otherwise disseminate the information via an application programming interface ("API"), an RSS feed, or some other structured format. For example, for virtual affinity groups that use fitness or health data as a potential characteristic, data from a fitness-related API such as that provided by the FITBIT activity monitoring service may be analyzed. The information may be analyzed or used by the virtual affinity group processing platform 110 on an individual item basis or on an aggregate basis with other information. Further the data may be combined with one or more other data sources, such as publicly available data provided by the U.S. Census Bureau or the like. Pursuant to some embodiments, data collected about individuals may be indexed to aggregate data across a wide variety of data sources as well as to de-identify any personally identifiable information. For example, a record about a consumer may include a non-personally identifiable identifier used to associate information about the consumer such as name, address, one or more social media user names, telephone numbers, email addresses, with information associated with characteristic data collected pursuant to the operation of the present invention.

As shown, the virtual affinity group processing platform 110 may include a number of modules or components, including one or more underwriting modules 112, quoting modules 114, issuing modules 116, notification modules 118 and group administration module 119. Virtual affinity group processing platform 110 may be deployed as a number of different platforms in communication with each other (for example, one processing platform may be deployed as a virtual affinity group administration platform, while another may be deployed to function as benefit issuance platform). Pursuant to the present invention, the notification modules 118 may be used to transmit information to eligible individuals, to service providers, and to other entities, including information relating to one or more virtual affinity groups established pursuant to the present invention. In some embodiments, one or more group administration modules 119 may be provided to receive data associated with different virtual affinity groups, including information used to create and maintain one or more virtual affinity groups.

As will be described further below, the underwriting modules 112 may be used in conjunction with the creation and updating of one or more rating schedules for use in pricing and rating insurance policies or in creating insurance benefits or other offers for virtual affinity groups pursuant to embodiments of the present invention. For example, in some embodiments, the underwriting modules 112 are used to analyze both conventional underwriting data such as historical loss information in conjunction with social and business network based data for use in rating and pricing business insurance policies.

Referring still to FIG. 1, the quoting and issuing modules 114 and 116 may be used in conjunction with the quoting, rating and pricing of insurance policies (e.g., in response to requests for quotes received from participants in virtual affinity groups). Note that the underwriting module 112, quoting module 114, and/or issuing module 116 may be associated with various types of insurance policies, including automobile and home insurance policies, for individuals and/or companies.

Although a single virtual affinity group processing platform 110 is shown in FIG. 1, any number of such devices may be included. Moreover, various devices described herein might be combined according to embodiments of the present invention. For example, in some embodiments, the virtual affinity group processing platform 110 and modules 112-119 might be co-located and/or may comprise a single apparatus.

The virtual affinity group processing platform 110 and the modules 112-119 may also access information in one or more databases 170, 180 and 190. The databases may include, for example, risk characteristic data 170, historical loss data 180 associated with previously-issued insurance policies, and policy data 190 associated with active policies. As will be described further below, the policy data 190 may be used to process information associated with virtual affinity groups established pursuant to the present invention and to provide insurance related offers (and process insurance requests) from individuals associated with virtual affinity groups. The data from such data sources may be used to identify one or more starting aggregated groups that are used to identify one or more characteristics for the creation of a virtual affinity group. For example, pursuant to some embodiments, a data mining and analysis process may be performed to identify desired characteristics for a virtual affinity group from underwriting and loss data (e.g., obtained from data sources 170-190).

Figure 2:
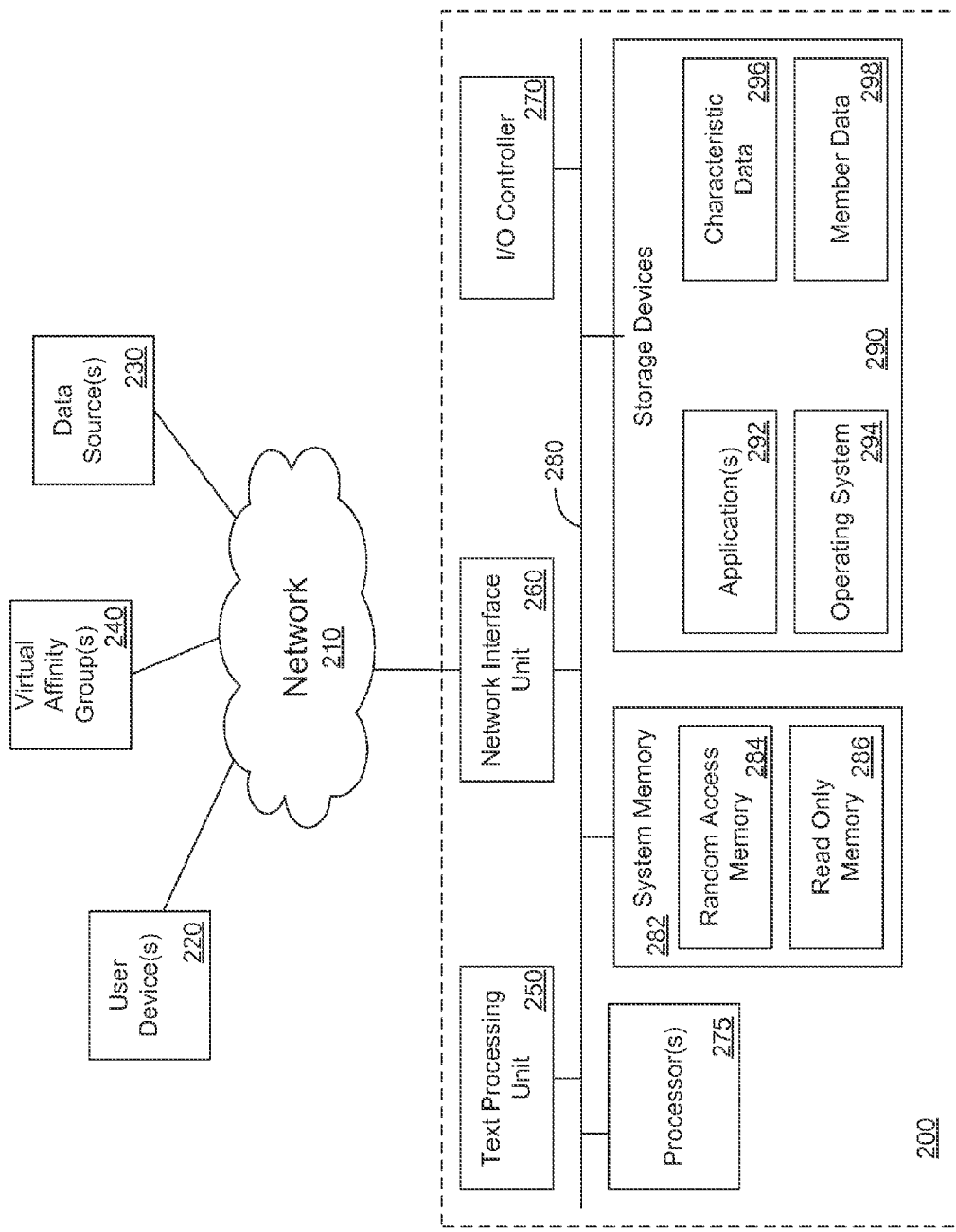
FIG. 2 is block diagram of a system according to some embodiments of the present invention.

Referring now to FIG. 2, one embodiment of the present invention is shown for generating and administering virtual affinity groups for use in providing targeted offers of insurance, insurance renewal information, or other insurance related information. As shown in FIG. 2, the virtual affinity group processing platform 200 communicates via network 210 to send data to, and receive data from, a plurality of user devices 220 (such as mobile phones, computers, or the like), a plurality of data sources 230 (such as social networking sites, public data sources, or the like), and a plurality of virtual affinity groups 240 to enable an insurance company to generate and administer virtual affinity groups for use in providing insurance-related offers and information.

Platform 200 also may include a number of devices or components, including computer processor(s) 275 and text processing units 250. The computer processor 275 and the text processing unit 250 may include one or more conventional microprocessors and may operate to execute programmed instructions to provide functionality as described herein. Among other functions, the computer processor 275 and/or the text processor 250 may access and retrieve information from data source(s) 230 via network interface unit 260 and input/output controller 270 via system bus 280.

Data identifying one or more desired characteristics may be stored in a data store 296. The characteristic data may be obtained from one or more data modeling or analytic processes based on existing insurance information. For example, an insurance modeling process may identify certain characteristics as providing a desirable insurance risk profile. Information identifying such characteristics may be stored in data store 296 and used in the creation of a virtual affinity group of individuals possessing the characteristic. In some embodiments, additional characteristic data may be added as further attributes of a virtual affinity group become known. The characteristic data is then used to identify individuals who possess the characteristic.

For example, in a mode of operation in which the virtual affinity group processor is operated to identify eligible individuals for participation in a virtual affinity group (such a the "AUDI A4" group introduced above as an illustrative example), the text processor 250 may be operated to scan existing forums, social media sites, and other web sites to analyze data associated with individuals interested in AUDI A4 automobiles. The data analyzed may include forum posts, comments, Web blog posts, images, preferences (such as preferences or profile data associated with user accounts on sites such as the GOOGLE+ social media service, the FACEBOOK social media service, or the like), TWITTER social media service posts, etc. The text processor 250 may be programmed to identify different types of statements or comments that are relevant to the virtual affinity group. For example, natural language processing techniques may be used to mine certain characteristic information based on the characteristics of the virtual affinity group to determine whether an individual is eligible to participate in the virtual affinity group.

Pursuant to some embodiments in which the virtual affinity group is established with a high level of interest required for participation in a group, different weightings of types of data may be established and used when mining data. For example, if the "AUDI A4" virtual affinity group is created to only allow participation by individuals owning an AUDI A4 automobiles who exhibit a level of interest that tends to suggest that those individuals would be a low insurance risk, the text processor 250 may be programmed to weight certain types of comments more heavily. As a specific illustrative example, it may be determined that individuals who actively maintain and care for their cars present a lower insurance claim risk. As such, the text processor 250 may be programmed to give greater weight to comments associated with AUDI A4 automobiles maintenance. Individuals who post frequent quality comments on an AUDI A4 automobiles maintenance forum would be more likely to be invited to participate in the virtual affinity group than individuals who do not.

Other parameters, criteria and inputs may be provided to control the text processor 250 to collect and analyze data such that only eligible individuals are identified for participation in virtual affinity groups. For example, individuals who are frequent commenters or posters on certain types of authority sites may be targeted. Authority sites may be identified using any of a number of different criteria. For example, GOOGLE'S internet searching service PAGERANK internet analysis service system may be used to identify credible or authority sites (where sites having a higher PAGERANK internet analysis service may be considered more credible than sites with lower PAGERANK internet analysis service scores). As another example, relative traffic data between different sites may also be used to assess the authority of sites (for example, a site with a higher number of monthly page views may be considered to be more authoritative than a site with a low number of monthly page views).

Other indicia of an individual's engagement or interest level may also be used. For example, certain Web sites rank commenters or participants and categorize the reputation of individual participants based on how much the community trusts the individual's knowledge on a topic, communication skills, and the quality and relevancy of the individual's questions and answers and participation. For example, the STACKESCHANGE question and answer service and other similar sites provide badges indicating the reputation level of each participant. A participant with a high number of quality and knowledgeable comments on a topic may be classified as a "Super User". Such indicators of an individual's quality and quantity of engagement on a topic may be used to characterize the individual's level of interest and expertise in an area and may be used as a characteristic or criteria for inclusion in a virtual affinity group pursuant to some embodiments.

The virtual affinity group processing platform 200 may further include a program memory 282 that is coupled to the computer processor 275. The program memory 282 may include a random access memory 284 and a read only memory 286. System memory 282 is further coupled via bus 280 to one or more fixed storage devices 290, such as one or more hard disk drives, flash memories, tape drives or other similar storage devices. Storage devices 290 may store one or more application programs 292, an operating system 294, and one or more databases such as a characteristic database 296 for storing data identifying characteristics or criteria that are used to determine which individuals are eligible for participation in a virtual affinity group. For example, characteristics or criteria may include: geographic data (e.g., data identifying where an individual must reside to participate), demographic data (e.g., income, gender, age, or other data required for eligible individuals), engagement data (e.g., information identifying a quantity and/or quality of interest data needed to be considered eligible for participation), or the like. Other attributes may also be analyzed to determine whether an individual is eligible for participation in a group. For example, statements, postings or other comments (generally referred to herein as "comments") made by an individual may be positively correlated with risk based on the nature of those comments or may be weighted differently than other comments by that individual. As an example, comments with low sentence complexity, inappropriate language, or poor grammar may be given less weight than comments with high sentence complexity and spelling accuracy. Platform 200 may also include a member database 298 for storing data associated with a plurality of individuals identified as eligible for participation in the virtual affinity group. For example, the member database 298 may include information identifying individuals by name, address, phone number, IP address, or the like. In some embodiments, members may be further identified using one or more unique codes or identifiers used to permit access to the virtual affinity group.

Platform 200 may be, according to some embodiments, accessible via a Graphical User Interface (GUI) rendered at least in part by input/output controller 270. The GUI might be used, for example, to dynamically display information associated with virtual affinity groups, as well as the administration of those groups. For example, in some embodiments, a user interface such as that shown and described below in conjunction with FIG. 5 may be provided as a portal or page for members of a virtual affinity group to obtain information and benefits provided as a result of their participation in a virtual affinity group. In some embodiments, participation in a virtual affinity group need not include access to such a portal or page for members; instead, participation may be automatic once an individual is determined to possess the requisite characteristics of the group.

Referring still to FIG. 2, the platform 200 performs processing to receive, process and extract relevant information from data source(s) 230 (such as social network data, search queries, blog comments, forum posts, etc.). The processing and extraction of information from the data source(s) 230 may take one or more of a number of different forms. For example, the processing platform 200 may monitor or search for activity associated with certain defined characteristics associated with one or more virtual affinity groups. In the illustrative example, the platform 200 may be operated to search for activity associated with "AUDI A4" searches, comments or posts to identify potential participants in a virtual affinity group for enthusiasts of AUDI A4 automobiles. As another example, the processing platform 200 may perform actions to invite or encourage such identified individuals to participate in an established virtual affinity group. As another example, the processing platform 200 may perform one or more insurance-related actions to underwrite, quote or issue insurance products for participants in a virtual affinity group. Other examples will be introduced in the embodiments described below. The search and processing of processing platform 200 may involve the use of natural language processing techniques to determine whether certain search, posting, or other activities of consumers contain, in substance, information relevant to one or more virtual affinity groups.

It is contemplated that the processing platform 200 may process data and information in one or more languages, such English, French, Arabic, Spanish, Chinese, German, Japanese and the like. In an exemplary embodiment, underwriting analysis by the platform 200 also can be employed for sophisticated text analyses, wherein text can be recognized irrespective of the text language. The relationships between the various words/phrases can be clarified by using an insurance rules engines for classifying words/phrases as a predictor of certain underwriting risk or as a predictor of intent or interest (e.g., to determine whether an individual should be eligible for participation in a virtual affinity group).

Figure 3:
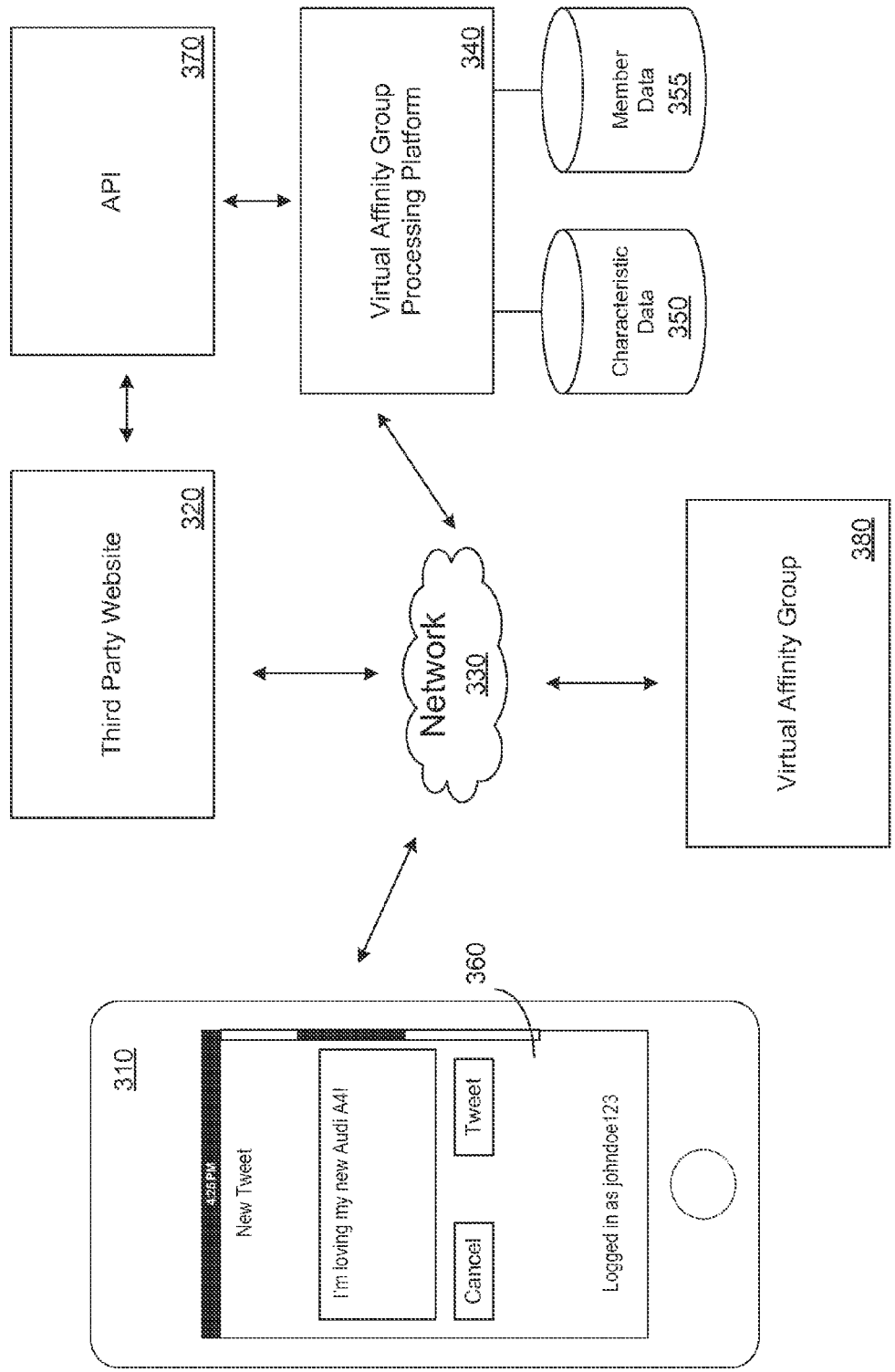
FIG. 3 is block diagram of a system according to some embodiments of the present invention.

Reference is now made to FIG. 3, in which an embodiment of a system 300 configured to identify eligible individuals for participation in a virtual affinity group is shown. As shown, system 300 includes a mobile device 310 operated by an individual. The individual is shown operating the mobile device 310 to post a "tweet" using his TWITTER social media service account ("johndoe123"). The tweet is a message announcing that the individual is "loving my new AUDI A4", and sending the message will cause a website 320 (e.g., twitter.com) to post an update associated with johndoe123's TWITTER social media service feed with the content of the message. Pursuant to some embodiments, TWITTER social media service feeds (as well as data from a variety of other sites and forums) are monitored by the virtual affinity group processing platform 340 to identify messages and posts which meet one or more characteristic data 350 associated with one or more virtual affinity groups. The data from the site 320 may be received and parsed using one or more application programming interfaces ("APIs")

370 which allow data from a large number of different sites to be collected and monitored by the virtual affinity group processing platform 340.

In the illustrative example introduced above, a virtual affinity group for AUDI A4 automobiles aficionados has been created (shown as item 380). Eligible individuals who may be invited to participate in the virtual affinity group may be identified by monitoring or analyzing posts, comments, messages or other actions taken by those individuals on third party websites (such as on the TWITTER social media service). In the example shown in FIG. 3, "johndoe123" may be identified as an eligible individual as he has expressed a current interest in AUDI A4 automobiles. Additional analysis of johndoe123 may be made under control of the virtual affinity group processing platform 340 to determine his eligibility. For example, a single post or comment may not be sufficient to become eligible, and the system may analyze additional comments or posts by johndoe123 to determine whether further interest in AUDI A4 automobiles has been expressed. Further, information (such as from third party databases) may be used to determine where the individual is located geographically, to determine a demographic profile of the individual, or the like. If the individual is determined to be eligible for participation in the virtual affinity group, a notification of the group may be communicated to the individual inviting participation in the group (e.g., in the illustrative example, johndoe123 may be sent a message over the TWITTER social media service to invite his participation in the group).

Individuals may create content and interact with third party websites using any of a number of different types of computing devices, including desktop computers, tablet computers, or mobile devices such as the mobile device 310. The mobile device 310 may be any of a number of different types of mobile devices that allow for wireless communication and that may be carried with or by a user. For example, in some embodiments, mobile device 310 is an IPHONE® mobile telephone device from Apple, Inc., a BLACKBERRY® mobile telephone device from RIM, a mobile phone using the GOOGLE ANDROID® operating system, a portable or tablet computer (such as the IPOD® from Apple, Inc.), a mobile device operating the Android® operating system or other portable computing device having an ability to communicate wirelessly with a remote entity such as a third party website 320.

Figure 4:
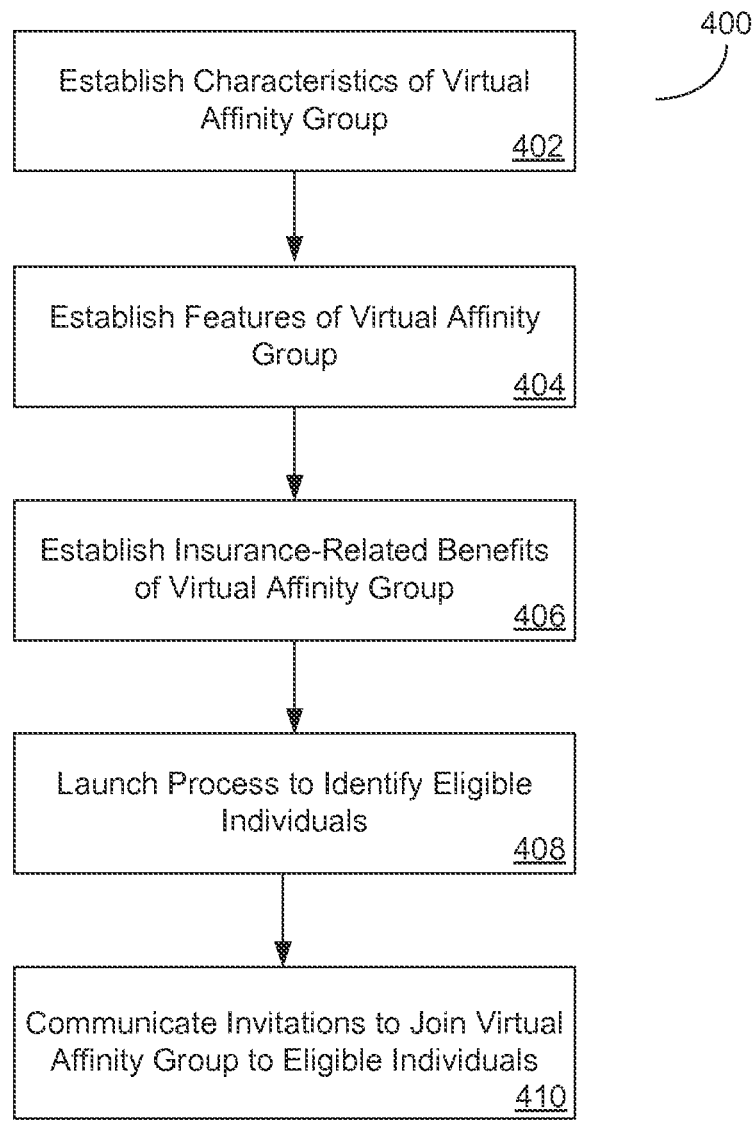
FIG. 4 is a flow diagram of a process according to some embodiments of the present invention.

FIG. 4 is a flowchart of a process 400 for establishing a virtual affinity group pursuant to some embodiments. The process 400 can be performed by the processing platform 110 (as shown in FIG. 1) or a combination of devices as described herein. The process 400 begins at 402 with the establishment of one or more characteristics of a virtual affinity group. The establishment of the characteristics may be performed by an administrator or operator of a system such as the system 100 or it may be an automated process. In embodiments where the establishment is performed by an administrator or operator, processing at 402 may include interaction with a user interface to define characteristics of a virtual affinity group to be created.

Processing at 402 may begin with information from a known set of insurance characteristics such as an aggregated group known to possess a desired insurance risk profile. For example, continuing the illustrative example, processing at 402 may include an operator assigning a virtual affinity group name (such as "AUDI A4 Group"), and then selecting or otherwise identifying one or more known characteristics of a aggregated group for inclusion in the virtual affinity group. For example, one of the starting characteristics of the "AUDI A4 Group" may be demographic, geographic or financial characteristics that are known to possess a desired insurance risk profile for automobile insurance. Those known characteristics may be used as a seed or a starting point for an administrator to define the set of characteristics required for participation in the virtual affinity group. The administrator may be presented with a set of characteristics to be selected from one or more predetermined characteristics that may be used across different virtual affinity groups (such as geographical characteristics, demographic characteristics or the like), and/or they may be custom attributes defined for each virtual affinity group. Custom attributes may include characteristics or criteria such as search terms, keywords, sites of interest, or the like. In the illustrative example, processing at 402 may include an operator defining one or more of the following characteristics for inclusion in the "AUDI A4 Group":

TABLE 1

| Characteristic | Required Values |
| --- | --- |
| Geographic Location | U.S. |
| Income Level | >$100,000 |
| Gender | Male, Female |
| Age | >21 |
| Keywords | AUDI, AUDI A4, AUDI maintenance, AUDI repair, AUDI accessories |
| Engagement Level | >5 comments within 1 month |

Once the required set of characteristics for inclusion in the virtual affinity group have been established, processing continues at 404 where an operator or administrator of the virtual affinity group defines one or more features of the virtual affinity group. The features may be selected from among a set of predefined templates or may be custom defined for each virtual affinity group. As an example, the features of a virtual affinity group may include features relating to content and information to be provided to participants. In embodiments where the virtual affinity group is one which will provide information to participants, features may also include information used to construct an automated portal or Web site which can be accessed by participants in the virtual affinity group. For example, continuing the illustrative example, features of the "AUDI A4 Group" may include a URL or web address associated with a portal of information including automated information (e.g., collected and displayed using RSS or XML feeds of information), static information (e.g., such as content specifically created for the group), and interactive information (e.g., such as forums, question and answer tools, or the like). The features may cause the display of a user interface such as the user interface shown in conjunction with FIG. 5.

Figure 5:
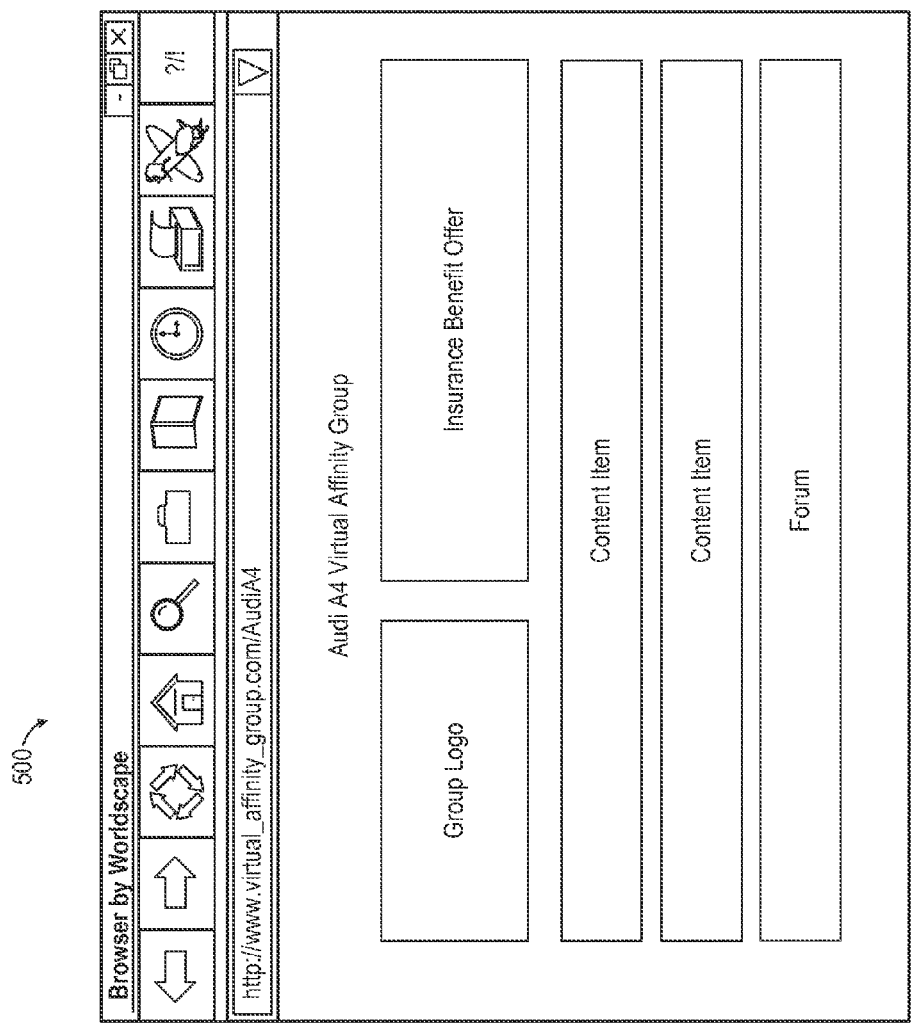
FIG. 5 is a user interface diagram depicting a virtual affinity group user interface according to some embodiments of the present invention.

Referring briefly to FIG. 5, an illustrative user interface 500 is shown which may be associated with a virtual affinity group established by the system of the present invention in embodiments in which participants are encouraged to visit a web site to interact with other participants in the group and view group information, features, and benefits (in other embodiments, no such web property is created—instead, participants are able to enjoy insurance related benefits available to members of the virtual affinity group without visiting such a web property). In the illustrative user interface 500, an example layout of a page is shown which may include a virtual affinity group logo or identifier, an area for one or more insurance benefit offers (e.g., which may be display ads or other forms of presenting an offer), one or more areas for displaying relevant content items (such as curated content, specially written content, or automatically generated or collected content from other sources about topics of interest to members of the virtual affinity group), and one or more areas for displaying interactive content (such as forums, question and answer pages, or the like). In this manner, in some embodiments, highly targeted and relevant content and offers may be presented to participants in the virtual affinity group.

In other embodiments, a portal or set of content may not be provided to participants. Instead, individuals who possess the requisite characteristics may automatically be identified as participants in the group, and any benefits or features of inclusion in the group may be automatically extended to those individuals. For example, an individual who possesses the required characteristics for inclusion in the "AUDI A4 group" may receive the insurance-related benefits automatically. For example, if the individual applies for an automobile insurance policy from the insurance company associated with the "AUDI A4 group," the individual may be automatically identified as being eligible for the benefits associated with the "AUDI A4 group" and may receive a discount, different pricing, or the like.

Referring again to FIG. 4, processing continues at 406 where one or more insurance-related benefits of the virtual affinity group are established. For example, pursuant to some embodiments, the benefits may include one or more insurance related benefits or offers that are to be provided to the participants in the virtual affinity group. In some embodiments, the insurance related benefits or offers may be designed based on an underwriting or risk analysis performed based on the characteristics established at 402. For example, continuing the illustrative example, the benefits associated with the "AUDI A4 Group" may include one or more insurance benefits designed to appeal to AUDI A4 automobile aficionados who have an annual household income in excess of $100,000 and who are over 21 years of age. The insurance benefits may include offers of personal lines insurance targeted to AUDI automobile owners or related insurance products. By creating such benefits based on the characteristics of individuals who will be invited to participate in the virtual affinity group, insurance benefits may be designed which closely match the interests of the group and that are priced based on attributes of the group. Insurance offers may thus be created that are priced based on the relative risk of a group of individuals having known characteristics. In some embodiments, the benefits may include group insurance benefits that are targeted to the affinity group.

Processing continues at 408 where a process is launched or initiated to identify eligible individuals for participation in the virtual affinity group. Eligible individuals are identified by applying one or more characteristics (defined at 402) to data collected or otherwise processed by the virtual affinity group processing platform 110. For example, once the characteristics of a group are defined, an automated process may be initiated which searches for information about individuals meeting those characteristics. In the illustrative embodiment, posts, comments, profiles, search queries, and other data may be processed to identify adult individuals in the U.S. who have an annual household income in excess of $100,000 and who have made more than 5 recent comments or posts involving certain keywords associated with "AUDI A4" topics. In some embodiments, processing at 408 may be repeated on a daily or more frequent basis to continually identify potential participants in the virtual affinity group. In some embodiments, the process may include further parameters to refine the sources of data to be analyzed. For example, the process may be limited to scanning or analyzing certain web properties (e.g., such as limiting the searches or analysis to data from the FACEBOOK social media service, the TWITTER social media service, the AUDIFORUMS forum service, or the like). Information about individuals who meet the characteristic requirements are stored in a database (such as member database 298).

Processing continues at 410 where the system is operated to communicate invitations to eligible individuals to join or otherwise participate in the virtual affinity group. In some embodiments, the data collected about eligible individuals at 408 includes contact data (such as an email address, physical mailing address, a FACEBOOK social media service OR a TWITTER social media service ID, or the like). For eligible individuals that have contact information, processing at 410 may include the generation and transmission of an invitation to participate in the virtual affinity group. In some embodiments, rather than transmitting an invitation to participate, eligible individuals may be presented with a display advertisement (e.g., using ad retargeting or other techniques) to promote their participation in the virtual affinity group. In some embodiments, eligible individuals need not be informed of their eligibility to participate in the virtual affinity group—instead, those individuals are de facto participants in the group based on the determination that they meet the characteristic data for the group.

In embodiments where eligible individuals are notified regarding their eligibility for participation in a virtual affinity group, the notification may be performed by an email, direct message, mail, or telephone call in which details of the features and benefits of participating in the virtual affinity group are communicated to each eligible individual. The notification may include information for accessing and interacting with the virtual affinity group and, in some embodiments, may include a unique identifier, code or other identifier used to access the virtual affinity group and identify the individual. The information communicated may include instructions for accessing the virtual affinity group (including user names and passwords) as well as information identifying the nature of the insurance benefits available to the individual through their participation in the group.

Pursuant to some embodiments, the communication performed at 410 may be performed by providing a highly segmented list of participants to one or more insurance agents or brokers for use in contacting the participants to make one or more insurance-related offers. For example, a file or feed of data of participants may be provided to agents or brokers in different geographical areas for their use in communicating offers to participants.

Process 400 may be repeated as needed to continue to identify eligible participants. Further, process 400 may include an update process in which additional characteristics are identified. The update process may analyze participants of the group to identify one or more additional characteristics shared by at least a portion of the group which are predicted (or shown) to provide desirable insurance related risk. The update process may result in the addition of one or more required characteristics for inclusion in the group, or it may result in the creation of one or more additional groups. In this manner, embodiments allow the creation of highly targeted groups of individuals who share a common interest or profile and who can receive insurance related offers or information based on those common interests or profiles.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

While the illustrative example presented herein relates to a topic-centric virtual affinity group, embodiments may also be provided which are product or merchant-centric. For example, in a merchant-centric embodiment, specific merchants (such as, for example, a restaurant) may be the subject of a special type of virtual affinity group which involves participants who are patrons of the merchant. Customers who have visited or otherwise are familiar with the merchant may be identified and invited to join or participate in a virtual affinity group associated with the merchant. Those participants may be prompted to provide information about the merchant and their experience with the merchant. In some embodiments, the information solicited may include information used by an insurance company to validate policy data associated with the merchant. As an illustrative example, in the case of a restaurant insured by an insurance provider, customers who have patronized the restaurant may be identified and invited to participate in a virtual affinity group associated with the restaurant. Participants may be prompted to provide information about the restaurant including information about their experience and also information about the restaurant operations and facility. The information about the restaurant operations and facility can be designed to validate or confirm details regarding the restaurant's insurance coverage and policy. For example, participants may be prompted to provide responses to questions such as: whether the restaurant was maintained in a clean condition, whether the restaurant served alcohol, whether the restaurant had a pool table, whether the restaurant had one or more video game machines, or the like. Some or each of these questions may be associated with an insurance underwriting or policy objective, and may be used to validate or update information associated with the insurance policy of the restaurant. The result is an ability to easily collect information from a variety of participants that may be useful in validating or auditing insurance related information.

Although specific hardware and data configurations have been described herein, not that any number of other configurations may be provided in accordance with embodiments of the present invention (e.g., some of the information associated with the databases described herein may be combined or stored in external systems).

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to a processor (such as the processor 275 of FIG. 2, or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented processing method for managing data flow to create and identify members for a virtual affinity group created based solely on an identified characteristic and not based on an existing affinity group, comprising:

storing, in a data storage device, historical underwriting data and historical loss data;

analyzing, by a virtual affinity group computer processor, the historical underwriting data and the historical loss data to determine an aggregated group of risk characteristics;

identifying, by the virtual affinity group computer processor based upon analysis of the aggregated group of risk characteristics, a first set of characteristics of the virtual affinity group to be created, the identified first set of characteristics comprising at least a demographic attribute and a psychographic attribute;

creating, by the virtual affinity group computer processor, the virtual affinity group based on the identified first set of characteristics;

creating, by the virtual affinity group computer processor, a web property domain for the virtual affinity group, wherein the web property domain includes at least one of a subdomain or a top level domain, and further includes at least automated feed-generated content and user-generated interactive content accessible by members of the virtual affinity group;

determining, by the virtual affinity group computer processor based on a risk analysis performed based on the identified first set of characteristics, a benefit comprising one of a pre-qualification for a product and a reduced rate for a product to be offered to said virtual affinity group;

receiving, by the virtual affinity group computer processor, data collection instructions identifying at least two of online forums, social media sites, and other web sites to monitor for potential members of the virtual affinity group, wherein the at least two of the online forums, the social media sites, and the other web sites comprise authority sites identified based upon a page view traffic data analysis of the authority sites;

responsive to creation of the web property domain, periodically triggering a potential member identification process comprising:

receiving, by the virtual affinity group computer processor based upon the data collection instructions, online data from the at least two of the online forums, the social media sites, and the other web sites;

analyzing, by the virtual affinity group computer processor, the received online data to identify at least a first individual matching the identified first set of characteristics of the virtual affinity group, said analyzing including categorizing, based upon natural language processing of the received online data, an interest level psychographic attribute of the potential members of the virtual affinity group;

updating, by the virtual affinity group computer processor, membership data of the virtual affinity group to include information identifying the at least first individual as being eligible for membership in the virtual affinity group;

transmitting an invitation to the at least first individual to join the virtual affinity group; and responsive to receipt of an affirmative response to the invitation, providing, by the virtual affinity group computer processor, access to the virtual affinity group, and the benefit, to the at least first individual.

2. The computer-implemented method of claim 1, further comprising:

analyzing, by the virtual affinity group computer processor, the received online data to identify a geographic characteristic of said virtual affinity group, the geographic characteristic identifying an additional desired characteristic of members of the virtual affinity group;

wherein analyzing, by the virtual affinity group computer processor, the received online data to identify the at least first individual further comprises analyzing the received online data to identify the at least first individual matching the geographic characteristic of the virtual affinity group.

3. The computer-implemented method of claim 1, wherein analyzing the received online data to categorize the interest level psychographic attribute of the potential members of the virtual affinity group comprises scanning the received online data with a text processor to identify statements or comments relevant to the virtual affinity group and identifying the at least first individual matching the first set of characteristics of the virtual affinity group based on the identified statements or comments.

4. The computer-implemented method of claim 3, wherein the statements or comments relevant to the virtual affinity group are weighted by the text processor to give a predetermined greater weight to comments by individuals who exhibit one or more of (a) a predetermined high number of posts of a predetermined quality on a subject matter related to the virtual affinity group, (b) posts of a predetermined quality on a subject matter related to the virtual affinity group, and (c) comments with a predetermined level of correct grammar and a predetermined level of spelling accuracy than to the comments by individuals who do not exhibit the predetermined number of posts, the posts of the predetermined quality, or the comments with the predetermined level of correct grammar and the predetermined level of spelling accuracy.

5. The computer-implemented method of claim 1, wherein identifying the authority sites based upon the page view traffic data analysis of the authority sites comprises:

identifying, in the received online data, data from the authority sites having a predetermined threshold ranking or a predetermined threshold level of traffic, and data from commenters who have posted with a predetermined frequency on the authority sites;

wherein analyzing the received online data to identify the at least first individual comprises scanning the data from the authority sites to identify the at least first individual matching the first set of characteristics of the virtual affinity group from the commenters who have posted with the predetermined frequency on the authority sites.

6. The computer-implemented method of claim 5, wherein analyzing the received online data to identify the at least first individual comprises scanning the received online data with a text processor to identify an authority site generated reputation level of individuals associated with the authority sites, and identifying the at least first individual matching the first set of characteristics of the virtual affinity group based on the authority site generated reputation level of the individuals associated with the authority sites.

7. A computer system for accessing and modifying data to create and identify members for a virtual affinity group created based solely on an identified characteristic and not based on an existing affinity group, comprising:

one or more data storage devices including historical underwriting data and historical loss data;

one or more virtual affinity group computer processors in communication with the one or more data storage devices;

a memory in communication with the one or more virtual affinity group computer processors and storing program instructions, the one or more virtual affinity group computer processors operative with the program instructions to:

analyze the historical underwriting data and the historical loss data to determine an aggregated group of risk characteristics;

identify a first set of characteristics of the virtual affinity group to be created, the first set of characteristics based upon analysis of the aggregated group of risk characteristics and comprising at least a demographic attribute and a psychographic attribute;

create the virtual affinity group based on the identified first set of characteristics;

create a web property domain for the virtual affinity group, wherein the web property domain includes at least one of a subdomain or a top level domain, and further includes at least automated feed-generated content and user-generated interactive content accessible by members of the virtual affinity group;

determine, based on a risk analysis performed based on the identified first set of characteristics, a benefit comprising one of a pre-qualification for a product and a reduced rate for a product to be offered to said virtual affinity group;

receive data collection instructions identifying at least two of online forums, social media sites, and other web sites to monitor for potential members of the virtual affinity group, wherein the at least two of the online forums, the social media sites, and the other web sites comprise authority sites identified based upon a page view traffic data analysis of the authority sites;

responsive to creation of the web property domain, periodically trigger a potential member identification process to:

receive, based upon the data collection instructions, online data from the at least two of the online forums, the social media sites, and the other web sites;

analyze the received online data to identify at least a first individual matching the first set of characteristics of the virtual affinity group, said analyzing including categorizing, based upon natural language processing of the received online data, an interest level psychographic attribute of the potential members of the virtual affinity group;

update membership data of the virtual affinity group to include information identifying the at least first individual as being eligible for membership in the virtual affinity group;

transmit an invitation to the at least first individual to join the virtual affinity group; and responsive to receipt of an affirmative response to the invitation provide access to the virtual affinity group, and the benefit, to the at least first individual.

8. The system of claim 7, further comprising a policy quoting system comprising:

one or more quoting data storage devices;

one or more quoting processors in communication with the one or more data storage devices;

a quoting system memory in communication with the one or more quoting processors and storing quoting program instructions, the one or more quoting processors operative with the quoting program instructions to:

receive a request for a policy quote from the computer system for an individual identified in the membership data of the virtual affinity group;

determine the policy quote for the individual; and provide the policy quote to the computer system.

9. The system of claim 7, wherein the one or more virtual affinity group computer processors are further operative with the program instructions to analyze the received online data to identify a geographic characteristic of the virtual affinity group, the geographic characteristic identifying an additional desired characteristic of members of the virtual affinity group and wherein the one or more virtual affinity group computer processors being operative with the program instructions to analyze the received online data to identify the at least first individual further comprises the one or more virtual affinity group computer processors being operative with the program instructions to analyze the received online data to identify the at least first individual matching the geographic characteristic of the virtual affinity group.

10. The system of claim 7, wherein the one or more virtual affinity group computer processors being operative with the program instructions to analyze the received online data to categorize the interest level psychographic attribute of the potential members of the virtual affinity group comprises the one or more virtual affinity group computer processors being operative with the program instructions to scan the received online data with a text processor to identify statements or comments relevant to the virtual affinity group and identify the at least first individual matching the first set of characteristics of the virtual affinity group based on the identified statements or comments.

11. The system of claim 10, wherein the statements or comments relevant to the virtual affinity group are weighted by the text processor to give a predetermined greater weight to the statements or comments by individuals who exhibit one or both of (a) a predetermined level of interest in a subject matter related to the virtual affinity group, or (b) comments of a predetermined quality posted on a subject matter related to the virtual affinity group than to the statements or comments by individuals who do not exhibit the predetermined level of interest or the comments of the predetermined quality.

12. The system of claim 7, wherein identifying the authority sites based upon the page view traffic data analysis of the authority sites comprises:

the one or more virtual affinity group computer processors being further operative with the program instructions to identify the authority sites having a predetermined threshold ranking or a predetermined threshold level of traffic and data from commenters who have posted with a predetermined frequency on the authority sites;

wherein the one or more virtual affinity group computer processors being operative with the program instructions to analyze the received online data to identify the at least first individual comprises the one or more virtual affinity group computer processors being operative with the program instructions to scan the data from the authority sites to identify the commenters who have posted with the predetermined frequency on the authority sites and identify the at least first individual matching said first set of characteristics of the virtual affinity group from the commenters who have posted with the predetermined frequency on the authority sites.

13. The system of claim 12, wherein the one or more virtual affinity group computer processors being operative with the program instructions to analyze the received online data to identify the at least first individual comprises the one or more virtual affinity group computer processors being operative with the program instructions to:

scan the received online data with a text processor to identify an authority site generated reputation level of individuals associated with the authority sites; and identify the at least first individual matching the first set of characteristics of the virtual affinity group based on the authority site generated reputation level of the individuals associated with the authority sites.

14. A non-transitory computer readable medium for managing data flow to create and identify members for a virtual affinity group created based solely on an identified characteristic and not based on an existing affinity group, having stored therein computer readable instructions that, upon execution by a virtual affinity group computer processor, cause the virtual affinity group computer processor to:

analyze historical underwriting data and the historical loss data to determine an aggregated group of risk characteristics;

identify a first set of characteristics of the virtual affinity group to be created, the first set of characteristics based upon analysis of the aggregated group of risk characteristics and comprising at least a demographic attribute and a psychographic attribute;

create the virtual affinity group based on the identified first set of characteristics;

create a web property domain for the virtual affinity group, wherein the web property domain includes at least one of a subdomain or a top level domain, and further includes at least automated feed-generated content and user-generated interactive content accessible by members of the virtual affinity group;

determine, based on a risk analysis performed based on the identified first set of characteristics, a benefit to be offered to said virtual affinity group, the benefit including at least one of a pre-qualification for a product and eligibility for a reduced rate;

receive data collection instructions identifying at least two online forums, social media sites, and other web sites to monitor for potential members of the virtual affinity group, wherein the at least two of the online forums, the social media sites, and the other web sites comprise authority sites identified based upon a page view traffic data analysis of the authority sites;

responsive to creation of the web property domain, periodically trigger a potential member identification process to:

receive, based upon the data collection instructions, online data from the at least two of the online forums, the social media sites, and the other web sites;

analyze the received online data to identify at least a first individual matching the first set of characteristics of the virtual affinity group, said analyzing including categorizing, based upon natural language processing of the received online data, an interest level psychographic attribute of the potential members of the virtual affinity group;

update membership data of the virtual affinity group to include information identifying said at least first individual as being eligible for membership in the virtual affinity group;

transmit an invitation to the at least first individual to join the virtual affinity group; and responsive to receipt of an affirmative response to the invitation, provide access to the virtual affinity group, and the benefit, to the at least first individual.

15. The non-transitory computer readable medium of claim 14, wherein the instructions further cause the virtual affinity group computer processor to identify, in the received online data, data from the authority sites having a threshold ranking or a threshold level of traffic;

wherein the instructions that cause the virtual affinity group computer processor to analyze the received online data to identify the at least first individual further cause the virtual affinity group computer processor to scan the received online data with a text processor to identify a reputation level of individuals associated with the authority sites; and wherein the instructions that cause the virtual affinity group computer processor to identify the at least first individual matching said first set of characteristics of the virtual affinity group cause the virtual affinity group computer processor to identify the at least first individual based on the reputation level of the individuals associated with the authority sites.

16. The non-transitory computer readable medium of claim 14, wherein providing the benefit to the at least first individual comprises providing the benefit to the at least first individual via the web property.

* * * * *